(12) United States Patent
Kagan

(10) Patent No.: US 9,906,488 B2
(45) Date of Patent: Feb. 27, 2018

(54) SURROGATE NAME DELIVERY NETWORK

(75) Inventor: Martin Kagan, Portland, OR (US)

(73) Assignee: Cedexis, Inc., Portland, OR (US)

( * ) Notice: Subject to any disclaimer, the term of this patent is extended or adjusted under 35 U.S.C. 154(b) by 379 days.

(21) Appl. No.: 13/882,153

(22) PCT Filed: Oct. 25, 2011

(86) PCT No.: PCT/US2011/057743
§ 371 (c)(1),
(2), (4) Date: Apr. 26, 2013

(87) PCT Pub. No.: WO2012/058238
PCT Pub. Date: May 3, 2012

(65) Prior Publication Data
US 2015/0215267 A1 Jul. 30, 2015

Related U.S. Application Data

(60) Provisional application No. 61/406,762, filed on Oct. 26, 2010.

(51) Int. Cl.
H04L 29/12 (2006.01)
H04L 29/08 (2006.01)
G06F 17/30 (2006.01)
H04L 12/851 (2013.01)

(52) U.S. Cl.
CPC .... H04L 61/1511 (2013.01); G06F 17/30864 (2013.01); H04L 47/24 (2013.01); H04L 61/302 (2013.01); H04L 61/305 (2013.01); H04L 61/6009 (2013.01); H04L 67/30 (2013.01)

(58) Field of Classification Search
None
See application file for complete search history.

(56) References Cited

U.S. PATENT DOCUMENTS

| 6,996,616 | B1 | 2/2006 | Leighton et al. |
| 7,155,723 | B2 | 12/2006 | Swildens et al. |
| 7,372,809 | B2 * | 5/2008 | Chen et al. .................. 370/229 |
| 7,523,181 | B2 | 4/2009 | Swildens et al. |
| 7,653,706 | B2 | 1/2010 | Day et al. |
| 7,680,876 | B1 | 3/2010 | Cioli et al. |
| 7,752,664 | B1 * | 7/2010 | Satish ................ G06F 21/55 713/187 |
| 8,566,928 | B2 * | 10/2013 | Dagon et al. .................. 726/22 |
| 8,631,489 | B2 * | 1/2014 | Antonakakis et al. ......... 726/22 |

(Continued)

FOREIGN PATENT DOCUMENTS

WO 2012058238 A2 5/2012

OTHER PUBLICATIONS

International Search Report and Written Opinion of the International Searching Authority for PCT/US2011/057743, dated Mar. 9, 2012, pp. 1-7.

Primary Examiner — Thomas Dailey
(74) Attorney, Agent, or Firm — Klarquist Sparkman, LLP

(57) ABSTRACT

A method for providing access to an Internet resource includes registering a surrogate nameserver to be an authoritative nameserver in a DNS network, receiving at the surrogate nameserver a DNS query, maintaining at the surrogate nameserver a cache that includes a resolution of the DNS query, and executing at the surrogate nameserver a policy code to make a determination of validity of one or more of the DNS query and the cached resolution.

25 Claims, 2 Drawing Sheets

(56) References Cited

U.S. PATENT DOCUMENTS

| | | |
|---|---|---|
| 9,385,988 B2 | 7/2016 | Kagan |
| 9,553,844 B2 | 1/2017 | Kagan |
| 2001/0049741 A1* | 12/2001 | Skene et al. ................. 709/232 |
| 2003/0065762 A1* | 4/2003 | Stolorz ............... H04L 12/2602 |
| | | 709/223 |
| 2004/0047349 A1 | 3/2004 | Fujita et al. |
| 2006/0112176 A1* | 5/2006 | Liu et al. ...................... 709/223 |
| 2006/0129672 A1 | 6/2006 | Mayer |
| 2007/0288588 A1 | 12/2007 | Wein et al. |
| 2010/0269174 A1 | 10/2010 | Shelest |

* cited by examiner

US 9,906,488 B2

SURROGATE NAME DELIVERY NETWORK

RELATED APPLICATION DATA

This application is the U.S. National Stage under 35 U.S.C. 371 of International Application PCT/US2011/057743 filed Oct. 25, 2011, entitled "Surrogate Name Delivery Network," which was published in English under PCT Article 21(2), and which further claims benefit of U.S. provisional patent application 61/406,762 filed 26 Oct. 2010, entitled "Surrogate Name Delivery Network," which is incorporated herein by reference in its entirety.

This application claims benefit of U.S. provisional patent application 61/406,762 filed 26 Oct. 2010, entitled "Surrogate Name Delivery Network," which is incorporated herein by reference.

FIELD OF THE INVENTION

Background

Web clients, such as web browsers operating on personal computers or on mobile computing devices, access a wide range of Internet resources (hereinbelow, "resources"), which may include files, web pages, applications, and mail servers, as well as access services, including gateways for voice and other media. Resources are generally maintained within infrastructures, which may include corporate data centers, cloud computing infrastructures, and Content Delivery Networks (CDNs). To access a resource over the Internet, a web client issues a resource request, which includes an Internet Protocol (IP) address of a server or service at which the resource is accessible.

Prior to issuing the resource request, the web client obtains the necessary IP address by executing a Domain Name System (DNS) query, by which a hostname, or Fully-Qualified Domain Name (FQDN), such as www.example.com, is resolved to the IP address.

A DNS query issued by a web client is directed to a DNS resolver. If the hostname specified in the DNS query has previously been resolved by the DNS resolver, then the resolution for the query may be in a resolver cache, and the resolver returns the cached resolution to the web client. If the resolution is not in the resolver cache, the resolver identifies a nameserver that is registered with a root nameserver in the DNS network as an authoritative nameserver (ANS) for the specified domain, e.g., example.com. The resolver sends the DNS query to the ANS, and the ANS returns a DNS response including the resolution. The resolver then sends the DNS response to the web client, which may then issue the resource request.

Generally, a resolution is maintained in the resolver cache for a period of time determined by a DNS Time-to-Live (TTL) value. TTL values are generally maintained at the ANS and delivered to the resolver within the DNS response.

DNS resolution and the operation of nameservers is described in publication RFC 1035 of the Internet Engineering Task Force (IETF) entitled, "DOMAIN NAMES IMPLEMENTATION AND SPECIFICATION", as well as in additional IETF publications related to DNS including RFCs 1033, 1034, 1912, 2181, 2136, 2535, and 4033, the teachings of which are all incorporated herein by reference.

U.S. Pat. No. 7,155,723 to Swildens, et al., whose disclosure is incorporated herein by reference, describes an ANS that performs resolution based on network information, service probes, latency probes, packet loss probes, bandwidth usage and static latency information.

U.S. Pat. No. 6,996,616 to Leighton, et al., whose disclosure is incorporated herein by reference, describes an ANS that utilizes a map maker service, which generates a nameserver map based on server performance.

SUMMARY

In accordance with an embodiment of the present invention, a method is provided for providing access to an Internet resource including registering a surrogate nameserver to be an authoritative nameserver in a DNS network, receiving at the surrogate nameserver a DNS query, maintaining at the surrogate nameserver a cache that includes a resolution of the DNS query, executing at the surrogate nameserver a policy code to make a determination of validity of one or more of the DNS query and the cached resolution, and responsively to the validity determination generating a DNS response to the DNS query.

The method may further include receiving the policy code at the surrogate nameserver. The policy code typically includes a set of conditions and actions.

In some embodiments a hostname specified by the DNS query indicates an infrastructure at which the Internet resource is to be accessed, making the determination of validity includes determining that the DNS query is invalid, and generating the DNS response includes generating a response that does not allow access to the infrastructure. Determining that the DNS query is invalid may include determining that a parameter of the DNS query is on a blacklist.

Typically, the DNS query is initiated by a web client, and making the determination of validity of the cached resolution comprises evaluating one or more parameters including a time-to-live value for the cached resolution, a time of receipt of the DNS query, a location of the web client, data in the DNS query, and a measure of system performance.

In some embodiments, generating the DNS response comprises sending a second DNS query from the surrogate DNS server to an origin DNS server, receiving at the surrogate DNS server from the origin DNS server an origin DNS response that includes a new DNS resolution, and including the new DNS resolution in the surrogate DNS response.

The method may further include receiving a purge command, and responsively to receipt of the purge command removing the DNS resolution from the cache.

The method may also include generating a report including one or more parameters of the validity determination, said parameters including data in the DNS query, a time of receipt of the DNS query, a location of the web client, and a measure of system performance. A report may also include a measure of aggregation of multiple DNS queries.

There is also provided, in accordance with further embodiments of the present invention, a system for providing access to an Internet resource including a surrogate nameserver configured with means for receiving a DNS query for a resolution of a fully-qualified domain name (FQDN), maintaining a cache that includes the resolution of the FQDN, executing a policy code to make a determination of validity of one or more of the DNS query and the cached FQDN resolution, and responsively to the validity determination generating a DNS response to the DNS query. The system may also include means for receiving the policy code.

There is also provided, in accordance with further embodiments of the present invention, a computer program product including a computer readable medium, which includes a computer readable program that when executed on a computer causes the computer to receive a DNS query for a resolution of a fully-qualified domain name (FQDN), to maintain a cache that includes the resolution for the FQDN, to execute a policy code to make a determination of validity of one or more of the DNS query and the cached FQDN resolution, and responsively to the validity determination to generate a DNS response to the DNS query.

The present invention will be more fully understood from the following detailed description of embodiments thereof.

DETAILED DESCRIPTION OF EMBODIMENTS

Figure 1:
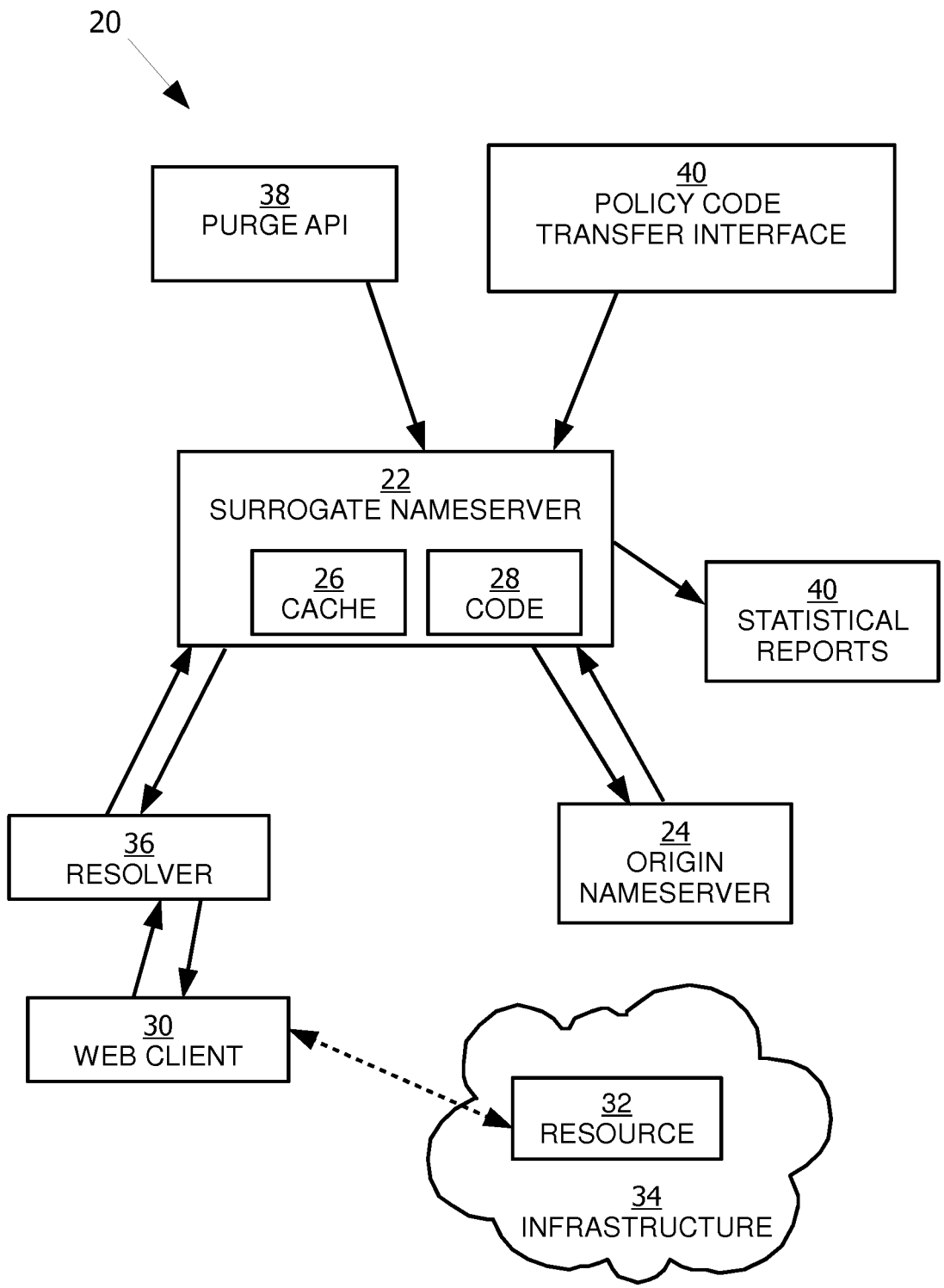
FIG. 1 is a schematic, pictorial illustration of a system for providing access to an Internet resource including a surrogate nameserver, according to an embodiment of the present invention.

FIG. 1 is a schematic, pictorial illustration of a system 20 that provides access to an Internet resource and includes a surrogate nameserver 22 and an origin nameserver 24, according to an embodiment of the present invention.

In embodiments of the present invention, surrogate nameserver 22 and origin nameserver 24 provide a multi-tier solution for resolving DNS queries for a resource provider domain, such as example.com. Both surrogate and origin nameservers are configured to perform nameserver functions complying with the abovementioned IETF RFCs, such as receiving DNS queries, generally by User Datagram Protocol (UDP), and providing DNS responses that resolve DNS queries.

Surrogate nameserver 22 is registered as an authoritative nameserver (ANS) for the resource provider domain. Origin nameserver 24, on the other hand, is typically managed by a resource provider as if it were an ANS for the resource provider domain. As described in the abovementioned IETF RFCs, an ANS typically performs DNS resolution by referring to mapping tables that are maintained at the ANS. Tasks of managing the origin nameserver include maintaining these mapping tables. Origin nameserver 24 may provide additional functionality, such as dynamic mapping that serves to balance traffic between multiple servers that each provide a copy of an Internet resource. Such load-balancing may be referred to as Global Server Load-Balancing (GSLB) or Global Traffic Balancing (GTB).

The surrogate nameserver is configured to maintain a cache 26 of DNS resolutions. In addition, the surrogate nameserver maintains a set of policy codes 28, which may also be referred to as metadata, or metadata applications. Policy codes may be maintained in a variety of formats, such as binary codes, JavaScript Object Notation (JSON), or Extensible Markup Language (XML), and may be maintained in one or more files or databases. The surrogate nameserver may also be configured to support policy codes that include programmable code with support for multiple programming languages or programming paradigms. Policy codes are typically configured by the resource provider, and may be implemented so as to support business goals.

Policy codes typically include one or more type or attribute identifiers, as well as a specification of conditions that determine when a given code is to be implemented, and the actions that are to be performed when conditions are met.

Policy code types may relate to time-to-live (TTL) values for cached DNS resolutions, to the time of day at which a DNS query is received, to locations of web clients issuing DNS queries (such as IP prefixes or net masks, network AS numbers, or geographic locations mapped to clients or resolvers), to data in the DNS query (the requestor, the domain and subdomain of the request, the record type, and other contents of the DNS request and response packet), and to measures of network load (performance, load, capacity, and availability of the surrogate itself, of peer or parent surrogates, of origin nameservers, and of external resources that may also communicate with the surrogate nameserver).

In a typical scenario, a web client 30 may seek access to a resource 32 in an infrastructure 34 of the resource provider domain. To gain access, the web client must acquire a resolution for the required hostname (such as www.example.com). To acquire this resolution, the web client sends a DNS query to a resolver 36. The resolver refers the DNS query to the authoritative nameserver for the designated domain, which is surrogate nameserver 22.

Upon receiving the DNS query, the surrogate nameserver applies policy codes 28 to determine whether a DNS resolution in cache 26 is valid as a response to the given DNS query. For example, the DNS query may be received at a time of day corresponding to a time-of-day policy code, which specifies that a cached DNS resolution is valid for a half-hour period, or Time-to-Live (TTL). A more complex set of policy codes may determine that a currently cached resolution is not valid due to the current network load and the geographic location of the web client.

If a cached DNS resolution is valid for a DNS query, then the surrogate nameserver generates a DNS response from the cached DNS resolution. If, on the other hand, a cached resolution is invalid, the surrogate nameserver issues a DNS query to the origin server in order to acquire a valid, or current, DNS resolution. Upon receiving the valid DNS resolution, including in a DNS response from the origin nameserver, the surrogate nameserver issues a DNS response to the resolver.

Policy codes may specify multiple origin nameservers from which the surrogate nameserver is to acquire DNS resolutions. Such specifications may also determine load balancing of queries across multiple origin nameservers based on time, location, and other criteria such as the source of the requests, the resource requested, and ideal distribution of load, current load relative to capacity, relative performance and availability, and other such capabilities. Policy codes may also determine fail-over policy, by which a second origin nameserver is queried if a first origin nameserver does not respond within a given period of time. Policies may also be set for consolidating responses from multiple origin nameservers, or selecting one, such as the first to be received.

The surrogate nameserver may also be configured to query other (peer or parent) surrogate nameservers. Policy codes may establish whether or not, and in what manner, a surrogate nameserver is to respond to a DNS query from another surrogate.

Various parameters of communication between the surrogate nameserver and the one or more origin and surrogate nameservers may also be set in policy codes, such as protocol (TCP or UDP), destination port, source IP address, gateway, and other network-level parameters.

By default, a caching nameserver uses the entire FQDN specified in a DNS query as a "cache key" to determine a mapping to a DNS resolution. A surrogate nameserver may modify the cache key by ignoring certain elements of the FQDN, or by adding additional elements, such as the identity of the requesting client. Such modifications serve to create multiple cache entries for the same subdomain and resource type. Policy codes may also manipulate DNS queries that are transmitted to origin servers. For example, the surrogate nameserver may modify the hostname, domain name, and record type of a DNS query before relaying the query to the origin server. The surrogate may also insert location information, such as the IP address or geo-data of the resolver into the query, or include authentication credentials to verify the identity of the surrogate, or convert the query between IPv4 and IPv6 formats.

Policy codes may specify how DNS responses from the origin nameserver are to be cached. Examples of policies for caching a new response include: caching the new response together with the TTL value returned by the origin nameserver, applying a fixed TTL, dynamically calculating a TTL based on an algorithm included in the given policy code, and not caching until a number of requests for a particular resolution exceeds a specific threshold. Caching rules may be applied differently based on specific attributes of the query and response, such as debugging flags, or specific client IP addresses or locations. Caching rules may also vary depending on other parameters of policy codes, such as time, performance and load, as described above.

Policy codes may also determine whether a DNS query is valid or invalid. An invalid DNS query would be, for example, one of a set of malicious queries, such as a set forming a denial of service attack. Policy codes may implement a variety of methods to identify and to prevent illicit traffic from accessing a resource provider infrastructure. For example, policy codes may refer to "blacklists" that specify specific IP addresses, or blocks of addresses (based on IP prefix or netmask), or networks (based on AS numbers), or other determinants of geographic location. When a parameter of a DNS query is included in such a blacklist, the surrogate nameserver may return no response, an error response (e.g., a NXDOMAIN error), an alternative response (e.g., a CNAME response) or an intentionally false response (e.g., a response directed to a localhost or a null-route IP address).

Surrogate nameservers and origin nameservers may also implement mutual authentication rules to insure that resolvers cannot bypass the surrogate. Generally, the origin nameserver is hidden from other nameservers and resolvers in the Domain Name System. The surrogate may also validate a DNS response using DNSSEC standards or other proprietary methods.

The surrogate nameserver may delay providing a DNS response in order to control the rate of throughput. Policy codes may determine delay times based on the load parameters described above. Policy codes may also determine length of queues of delayed responses and what actions to perform when a queue exceeds a certain length (such as dropping first or last responses in the queue).

Policy codes may also determine how a surrogate may modify or transform the contents of a DNS response, including adding, removing, or modifying records. Such transformations may enhance security or may provide means for transfer of additional data for various technical and business applications. Policy codes may also set rates at which responses may be returned (per customer, domain, or host).

Refreshing (i.e., acquiring a new DNS resolution from the origin server) or simply purging one or more records of DNS resolution in the surrogate cache may be performed when a DNS query is received, or may be initiated by the surrogate nameserver when a cached object is past or near its point of expiration. A resource provider can also force a refresh or purge via a direct or indirect request or Application Program Interface (API), indicated in FIG. 1 as purge API 38 . A purge request may purge (or refresh) one or more records. Regular-expression rules may be applied to indicate multiple records. Once a purge request is received, the surrogate nameserver implements the request as quickly as is technically possible, for example by setting a purge flag with the indicated records.

Typically, communications through the purge API include methods for authentication and authorization. The purge request may be sent by a message service, such as Java Message Service (JMS), or by any other synchronous or asynchronous communication means.

In an embodiment of the present invention, a resource provider or other coder of policy code may update, change, or edit policy code through policy code transfer interface 40 (PCTI). Typically, settings for the generation of surrogate nameserver logs and reports 42 can also be set through the PCTI.

Figure 2:
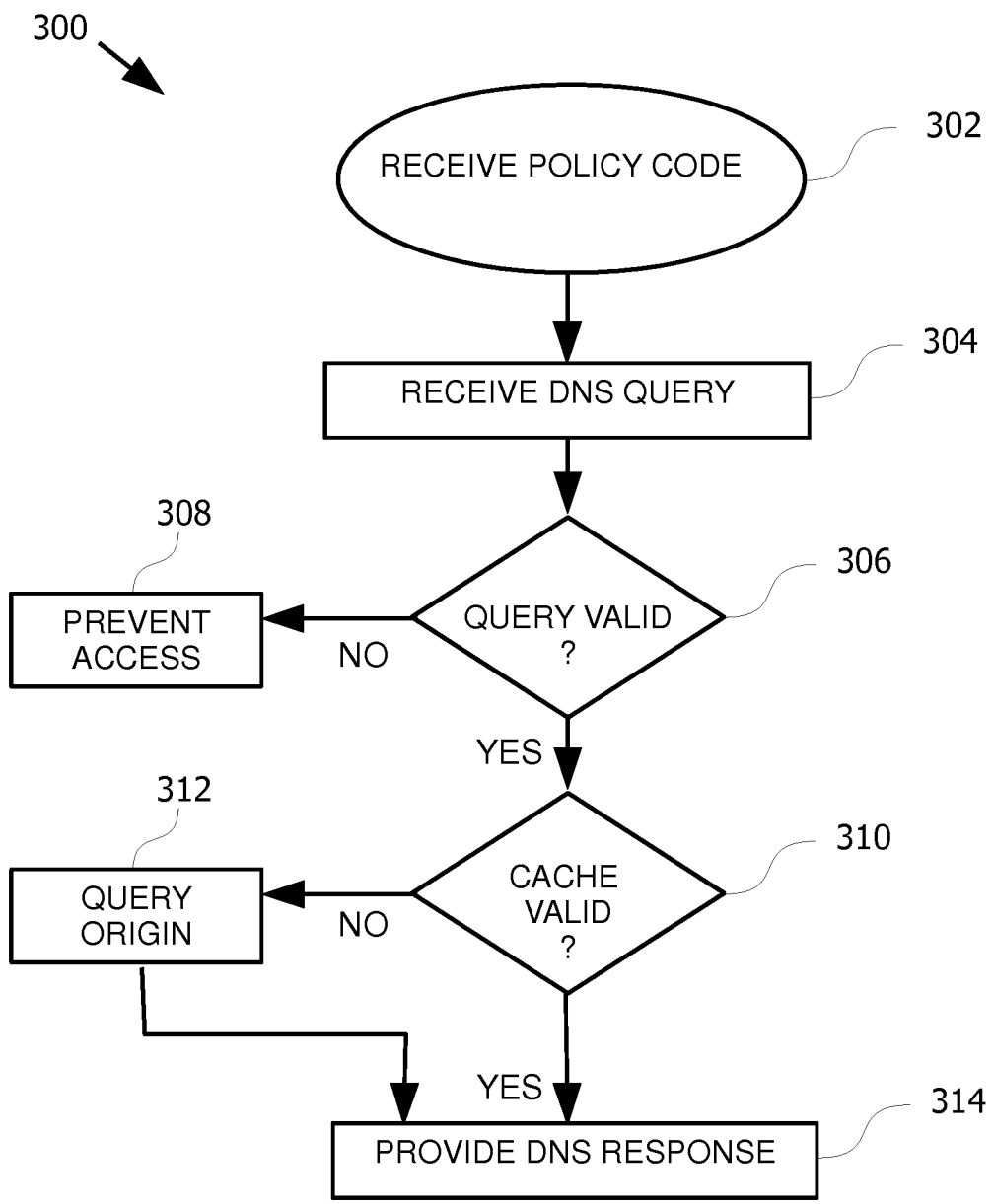
FIG. 2 is a flow diagram of a process for providing access to an Internet resource, according to an embodiment of the present invention.

FIG. 2 is a flow diagram of a process 300 for providing a web client with access to an Internet resource, according to an embodiment of the present invention.

At a step 302, a surrogate nameserver receives one or more policy codes, which may be transmitted by a resource provider as described above with respect to FIG. 1. Policy codes provide flexible control over multiple aspects of the operation of the surrogate nameserver.

At a step 304, the surrogate nameserver receives a DNS query. The DNS query is typically initiated by a web client and is transmitted via a resolver.

At a step 306, the DNS application server applies one or more policy codes to determine if the DNS query is valid. An invalid query is blocked, by means of a blocking DNS response provided at a step 308. The blocking response may be no response, or a response described in more detail above.

If the DNS query is valid, at a step 310, policy code determines cache validity, that is, whether or not a response from cache of a cached DNS resolution should be provided. The determination is based on a wide range of conditions of system status, DNS query, TTL parameters, and time-of-day, and business logic rules, described in more detail above. The cache may also be invalid if the desired record of DNS resolution was purged, as described above.

If the cached DNS resolution is not valid, then the DNS query is passed on to one or more origin nameservers at a step 312. Security measures in the communication, such as authentication, are typically implemented. The communication with the origin nameservers may also include fail-over, load-balancing, and queuing. The surrogate may also transform the DNS query and may monitor the subsequent response from the origin nameserver to determine origin nameserver and network performance.

After a response is received from the origin nameserver, or if the cached DNS resolution was determined at step 310 to be valid, then the surrogate nameserver returns a DNS response at a step 314, typically including in the response the desired DNS resolution. Alternative DNS responses may include hostname redirection or error messages.

Generally, the surrogate nameserver of the present invention may be implemented in software and/or in hardware. An embodiment as a software program product may be implemented as one or more applications on a general-purpose computing system. A computing system configured to implement the surrogate nameserver may have one or more processors and one or more network interface modules. Processors may be configured as a multi-processing or distributed processing system. The network interface modules control the sending and receiving of data packets over networks.

Such a computing system also includes memory storage for storing computer executable instructions that instruct the processors to perform various operations described herein. Memory storage may also include multiple distributed memory units, including one or more types of storage media. Examples of storage media include, but are not limited to, magnetic media, optical media, and integrated circuits such as read-only memory devices (ROM) and random access memory (RAM).

Policies implemented on the surrogate nameserver may determine actions to implement based on conditions of network and/or system performance. Such conditions may include: response time (which may be the elapsed time between sending a transmission and receiving a first response, or receiving a complete response, or similar measures, such as the time between requesting a service and having the service performed); connect time (such as a time for an IP connection, an SSL connection, or a connection to a transaction application server), transmission speed (typically measured in bytes/sec), error rates (such as percent of bad bytes or bad packets), connection jitter (a measure of variability in quality, such as variability of transmission speed or error rate), and rate of availability (e.g., rates of completion of connections or services). Further measures may include: instantaneous burst rates (i.e., instantaneous throughput as measured in bytes/second of resource content transmitted and/or received by an infrastructure), aggregate usage (i.e., total number of bytes transferred over a given period of time), number of queries served, number of open connections, transaction rates, threshold margins, or aggregate processing load.

It is to be understood that the embodiments described hereinabove are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for providing access to an Internet resource comprising:
    maintaining a first nameserver that is registered to be an authoritative nameserver and that includes a cache of DNS resolutions to DNS queries;
    receiving from a resource provider, a set of policy codes at the first nameserver, the policy codes indicating how the first nameserver responds to queries and conditions;
    accepting at the first nameserver directions to blacklist DNS queries;
    receiving at the first nameserver a first DNS query;
    executing at the first nameserver a policy code to determine how to respond to the first DNS query;
    determining, based on the policy code, that a parameter of the first DNS query is on the blacklist;
    responding to the first DNS query by throwing a blacklist error message;
    receiving at the first nameserver a second DNS query comprising a domain name, from a web client;
    forming a cache key by augmenting the domain name with an identity of the web client; and
    accessing the cache with the cache key to check for a valid cache resolution.

2. The method of claim 1, wherein a hostname specified by the first DNS query indicates an infrastructure at which the Internet resource is to be accessed, wherein responding to the first DNS query further comprises generating a response that does not allow access to the infrastructure.

3. The method of claim 1, wherein the policy code is a first policy code, wherein the valid cache resolution is a first valid cache resolution, and wherein the method further comprises:
    receiving at the first nameserver a third DNS query from a second web client;
    executing at the first nameserver a second policy code to determine how to respond to the third DNS query; and
    based on the second policy code, checking for a second valid cached resolution, wherein the checking for a second valid cached resolution comprises evaluating a location of the second web client.

4. A method for providing access to an Internet resource comprising:
    maintaining a first nameserver that is registered to be an authoritative nameserver and that includes a cache of DNS resolutions to DNS queries;
    receiving from a resource provider, a set of policy codes at the first nameserver, the policy codes indicating how the first nameserver responds to queries and conditions;
    accepting at the first nameserver directions to blacklist DNS queries;
    receiving at the first nameserver a first DNS query;
    executing at the first nameserver a first policy code to determine how to respond to the first DNS query;
    determining, based on the first policy code, that a parameter of the first DNS query is on the blacklist; and
    responding to the first DNS query by throwing a blacklist error message;
    receiving at the first nameserver a second DNS query;
    executing at the first nameserver a second policy code to determine how to respond to the second DNS query;
    determining, based on the second policy code, that the second DNS query is malicious; and
    responding to the second DNS query by generating a first DNS response, wherein generating the first DNS response comprises sending a third DNS query from the first nameserver to a second nameserver, receiving at the first nameserver from the second nameserver a second DNS response that includes a new DNS resolution, and including the new DNS resolution in the first DNS response.

5. The method of claim 1, further comprising receiving a purge command and responsively removing one or more DNS cached resolutions from the cache.

6. The method of claim 1, further comprising generating a report including one or more of the following parameters: data in the first DNS query, a time of receipt of the first DNS query, an origin of the first DNS query, or a measure of system performance.

7. The method of claim 1, and further comprising receiving a third DNS query and generating a report including a measure of aggregation of the first and third DNS queries.

8. A system for providing access to an Internet resource, the system comprising:
    a first nameserver, including a cache that holds DNS resolutions of DNS queries;
    wherein the first nameserver further includes memory for holding policy code to make a policy-based determination of validity of one or more of the DNS queries and the cached resolutions;

wherein the first nameserver further includes processor resources to receive from a resource provider a set of policy codes indicating how the first nameserver responds to queries and conditions;

wherein the first nameserver further includes processor resources to receive directions to blacklist DNS queries; and wherein the first nameserver further includes processor resources to receive a first DNS query directed to an authoritative DNS server, execute a first policy code, determine validity of the first DNS query, and responsively generate a response to the DNS query by returning an intentionally false response;

wherein the first nameserver further includes processor resources to:
receive at the first nameserver a second DNS query;
execute at the first nameserver a second policy code to determine how to respond to the second DNS query;
determine, based on the second policy code, that the second DNS query is malicious; and
respond to the second DNS query by generating a first DNS response, and wherein the processor resources to generate the first DNS response include resources to:
send a third DNS query to a second nameserver,
receive from the second nameserver a second DNS response that includes a new DNS resolution, and
include the new DNS resolution in the first DNS response.

9. The system of claim 8, wherein the first nameserver further includes a port used to receive the set of policy codes.

10. The system of claim 8, wherein determination that the second DNS query is malicious comprises determining that a parameter of the second DNS query is on the blacklist.

11. The system of claim 8, wherein the first nameserver further includes processor resources to:
based on the second policy code, check for a valid cached resolution, wherein checking for a valid cached resolution comprises evaluation of one or more of: a location of the web client or a measure of system performance.

12. The system of claim 8, wherein the first nameserver further includes processor resources to generate a report including one or more of the following parameters: data in the DNS query, a time of receipt of the DNS query, a location of the web client, or a measure of system performance.

13. The system of claim 8, wherein the first nameserver further includes processor resources to generate a report including a measure of aggregation of the first and second DNS queries.

14. A computer program product comprising a computer readable non-transitory storage medium, which includes a computer readable program that when executed on a processor causes the processor to:
maintain a cache that includes DNS resolutions of DNS queries;
receive a set of policy codes, the policy codes indicating how to respond to queries and conditions;
accept directions to blacklist DNS queries;
receive a first DNS query;
execute a first policy code to determine how to respond to the first DNS query;
determine, based on the first policy code, that a parameter of the first DNS query is on the blacklist;
respond to the first DNS query by throwing a blacklist error message;
receive at the first nameserver a second DNS query;
execute at the first nameserver a second policy code to determine how to respond to the second DNS query;
determine, based on the second policy code, that the second DNS query is malicious; and
respond to the second DNS query by generating a first DNS response, and wherein the computer readable program further causes the processor to generate the first DNS response by sending a third DNS query to a second nameserver, receiving from the second nameserver a second DNS response that includes a new DNS resolution, and including the new DNS resolution in the first DNS response.

15. The computer program product of claim 14, wherein a hostname specified by the DNS query indicates an infrastructure at which an Internet resource is to be accessed, wherein responding to the DNS query further comprises generating a response that does not allow access to the infrastructure.

16. The computer program product of claim 14, wherein the DNS query is a first DNS query, wherein the computer readable program further causes the processor to:
receive at the first nameserver a second DNS query;
execute at the first nameserver a second policy code to determine how to respond to the second DNS query;
determine, based on the policy code, that the second DNS query is malicious;
respond to the second DNS query by generating a first DNS response, and wherein the computer readable program further causes the processor to generate the first DNS response by sending a third DNS query to a second nameserver, receiving from the second nameserver a second DNS response that includes a new DNS resolution, and including the new DNS resolution in the first DNS response.

17. The method of claim 1, wherein the policy code is a first policy code, further comprising:
receiving at the first nameserver a third DNS query; and
executing at the first nameserver a second policy code to determine how to respond to the third DNS query;
wherein determining how to respond to the third DNS query comprises delaying sending a DNS response in order to control a rate of throughput.

18. The method of claim 17, wherein delaying sending the DNS response in order to control the rate of throughput comprises: the second policy code determining a delay time based on load parameters.

19. The method of claim 18, wherein the load parameters include length of queued delayed responses.

20. The method of claim 19, wherein the second policy code further comprises a set of actions to take when a queue exceeds a certain length.

21. The method of claim 1, wherein the policy codes indicate how the first nameserver may modify or transform the contents of a DNS response received from a second nameserver.

22. The method of claim 1, wherein the policy codes indicate one or more rates at which responses are returned.

23. The method of claim 1, wherein the policy code is a first policy code, wherein the valid cached resolution is a first valid cached resolution, and wherein the method further comprises:
receiving at the first nameserver a third DNS query from a second web client;
executing at the first nameserver a second policy code to determine how to respond to the third DNS query; and based on the second policy code, checking for a second valid cached resolution, wherein the checking for a second valid cached resolution comprises evaluating a measure of system performance.

24. The method of claim 4, wherein the second DNS query includes a domain name and is received at the first nameserver from a requester, and wherein the third DNS query comprises the domain name and location information of the requester.

25. The method of claim 4, wherein the second DNS response comprises a second Time-to-Live value, and wherein the method further comprises:
   forming a cache entry based at least partly on the second DNS response and comprising a first Time-to-Live value that is distinct from the second Time-to-Live value; and
   storing the cache entry in the cache.

\* \* \* \* \*